United States Patent [19]

Jenness et al.

[11] Patent Number: 5,260,989
[45] Date of Patent: Nov. 9, 1993

[54] METHOD AND SYSTEM FOR ENHANCED DATA TRANSMISSION IN A CELLULAR TELEPHONE SYSTEM

[75] Inventors: Robert V. Jenness, Boca Raton; Victor S. Moore, Delray Beach, both of Fla.

[73] Assignee: International Business Machines Corporation, Armonk, N.Y.

[21] Appl. No.: 887,441

[22] Filed: May 21, 1992

[51] Int. Cl.⁵ ............................................ H04M 11/06
[52] U.S. Cl. ...................................... 379/59; 370/111; 370/94.1
[58] Field of Search ................ 379/59; 370/60, 94.1, 370/94.2, 110.4, 111, 118; 455/33.1, 34.1

[56] References Cited

U.S. PATENT DOCUMENTS 5,091,906  2/1992  Reed et al. ........................ 370/94.1
5,212,804  5/1993  Choate ............................... 453/34.1

Primary Examiner—Jin F. Ng
Assistant Examiner—Dwayne D. Bost
Attorney, Agent, or Firm—Andrew J. Dillon

[57] ABSTRACT

A method and system for enhanced data transmission within a cellular telephone system having multiple assigned voice channels separated by adjacent buffer voice channels. A data processing terminal is utilized to divide the data stream into multiple relatively short data packets which are then sequentially transmitted within alternate adjacent buffer voice channels. By switching from one adjacent buffer voice channel to a subsequent adjacent buffer voice channel, in a predetermined and repetitive order, as each data packet is transmitted, the amount of interference experienced in any one assigned voice channel is minimized. Synchronization between adjacent data packets may be achieved by either utilizing adjacent buffer voice channels in a predetermined and repetitive order or by concatenating an indication of the next buffer voice channel utilized with each data packet. A synchronization packet may also be included with each data packet to permit synchronization between adjacent data packets at the receiver.

11 Claims, 3 Drawing Sheets

METHOD AND SYSTEM FOR ENHANCED DATA TRANSMISSION IN A CELLULAR TELEPHONE SYSTEM

BACKGROUND OF THE INVENTION

1. Technical Field

The present invention relates in general to improvements in data transmission systems and in particular to enhanced methods and systems for data transmission in a cellular telephone system. Still more particularly, the present invention relates to an improved method and system for transmitting data packets within alternate adjacent buffer voice channels in a cellular telephone system.

2. Description of the Related Art

Data communication between modern computer devices is typically accomplished utilizing a modulator/demodulator or so-called "modem" which is utilized to convert digital signals within a data processing system to analog signals for transmittal over existing communication links. Additionally, such devices convert received analog signals to digital signals for utilization by a data processing system. In the past most distributed computer networks have been coupled together utilizing existing telephone land line systems, or specialized wiring; however, modern distributed data processing systems often utilize more sophisticated means of communication.

For example, the decreasing cost of cellular communication equipment has resulted in the utilization of that technology to couple together computers without the necessity of access to a telephone line outlet. This particular technology is particularly effective in combination with small portable battery powered laptop or notebook computers in which the necessary modem and cellular communication circuitry are miniaturized and provided in an integral fashion within the computer itself. Thus, an operator utilizing such a computer may initiate communications and transfer data between his or her computer and a distributed data processing system without the necessity of access to either telephone lines or power lines. Examples of such portable computers include the International Business Machines Corporation L40SX and the Model No. 9075 PCradio which may be utilized for wireless communication by attaching a radio device. Radio devices such as cellular telephone transceivers or ARDIS radio devices may be utilized.

Mobile data terminals which comprise battery powered data processing systems with cellular transceiver networks may be utilized to provide packet-switched access to services on remote hosts or other mobile data terminals by transmitting data via a cellular telephone system. Such systems typically support both voice and other analog traffic and the operation of such systems may be continued at full capacity, without awareness or interaction, with a data transmission system. Each mobile data terminal in such a system generally consists of an application component and a communications component, together referred to as a "subscriber unit." Data is accepted and forwarded to and from subscriber units by a Mobile Data Base System (MDBS) which manages the allocation of channels within a cellular telephone system.

In known prior art data transmission systems which utilize a cellular telephone system, communication between a subscriber unit and the MDBS takes place over a pair of channels. Subscriber units receive data from the MDBS over a "forward channel" and transmit data to the MDBS over a "reverse channel." The two channels utilized are related as set forth in the EIA/TIA-553 standard. An MDBS may maintain several forward channels simultaneously for communication with different sets of subscriber units and a given reverse channel may be multiplexed among subscriber units tuned to the corresponding forward channel. When a channel pair which is utilized for data transmission is reassigned to a new analog cellular circuit, the MDBS and subscriber units switch to another free channel and continue to operate in a procedure known as "channel hopping."

While such systems permit the transfer of data utilizing analog voice channels within a cellular telephone system, the increased utilization of cellular telephone systems for data transmission has resulted in an increased demand on such systems. As those skilled in the art will appreciate in such systems assigned voice channels are utilized for communication; however, each assigned voice channel is surrounded by vacant adjacent channels which are utilized to minimize interference between adjacent channels. It has recently been proposed that these vacant adjacent voice channels be utilized for data transmission by utilizing a very narrow band modulated carrier within one of these adjacent channels. By running such a data transmission at very low speeds and signal strength, the interference with adjacent assigned voice channels may be minimized; however, the resultant data transmission rates are generally not sufficient for modern data transmission systems.

It should therefore be apparent that a need exists for a method and system which will enhance the efficiency of data transmission within a cellular telephone system.

SUMMARY OF THE INVENTION

It is therefore one object of the present invention to provide an improved data transmission system.

It is another object of the present invention to provide an enhanced method and system for data transmission within a cellular telephone system.

It is yet another object of the present invention to provide an improved method and system for transmitting data packets within alternate adjacent buffer voice channels in a cellular telephone system in a manner which minimizes interference with adjacent assigned voice channels.

The foregoing objects are achieved as is now described. The method and system of the present invention may be utilized for enhanced data transmission within a cellular telephone system having multiple assigned voice channels separated by adjacent buffer voice channels. A data processing terminal is utilized to divide the data stream into multiple relatively short data packets which are then sequentially transmitted within alternate adjacent buffer voice channels. By switching from one adjacent buffer voice channel to a subsequent adjacent buffer voice channel, in a predetermined and repetitive order, as each data packet is transmitted, the amount of interference experienced in any one assigned voice channel is minimized. Synchronization between adjacent data packets may be achieved by either utilizing adjacent buffer voice channels in a predetermined and repetitive order or by concatenating an indication of the next buffer voice channel utilized with each data packet. A synchronization packet may also be included with each data packet to permit synchronization between adjacent data packets at the receiver.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
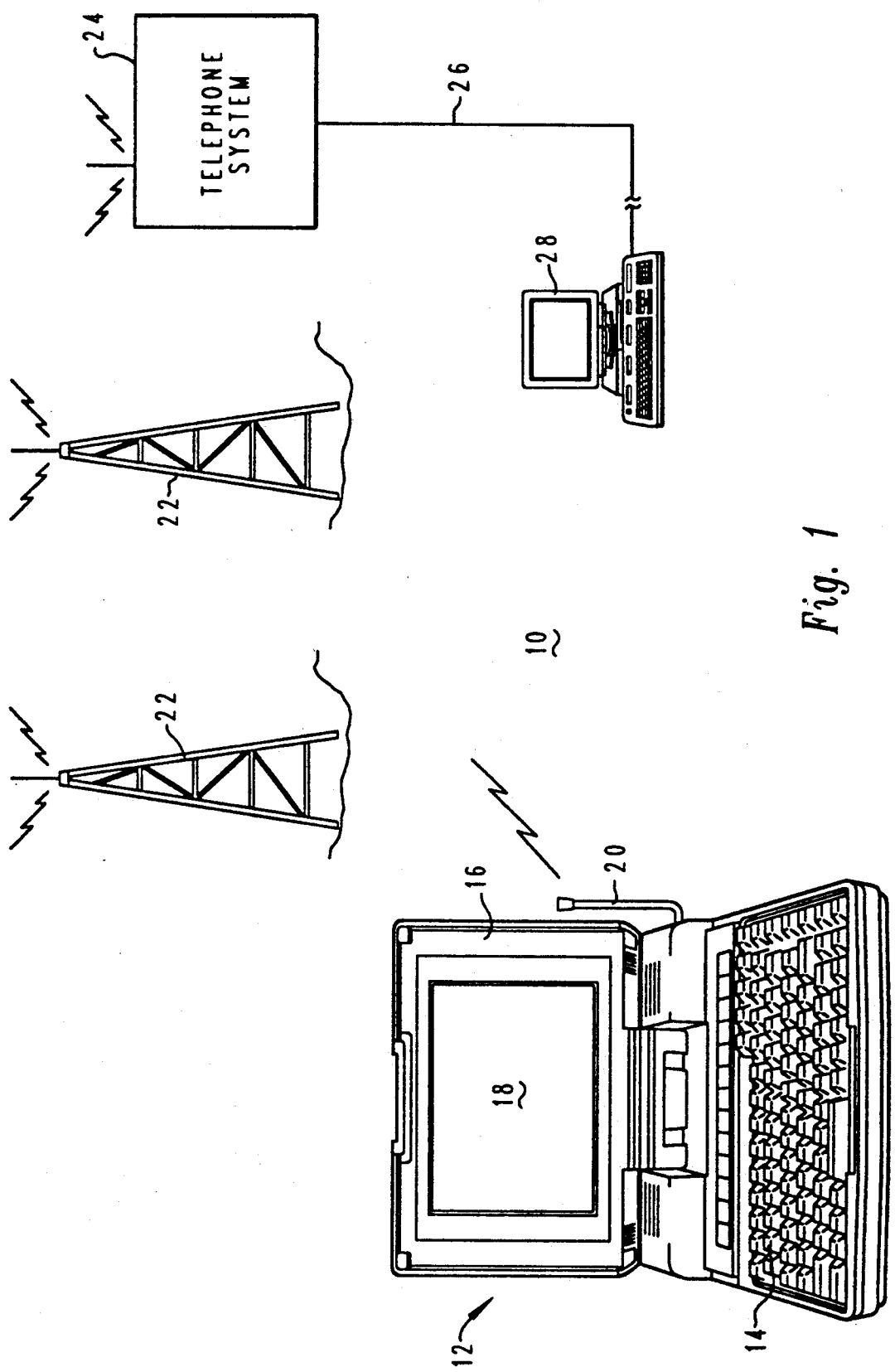
FIG. 1 is a partially schematic pictorial representation of a distributed data processing system which may be utilized for enhanced data transmission within a cellular telephone system in accordance with the method and system of the present invention.

With reference now to the figures and in particular with reference to FIG. 1, there is depicted a partially schematic pictorial representation of a distributed data processing system 10 which may be utilized for enhanced data transmission within a cellular telephone system in accordance with the method and system of the present invention. Upon reference to the foregoing those skilled in the art will appreciate that while distributed data processing system 10 is illustrated as including only two computers, typically such distributed data processing systems include a large number of computers distributed over a wide geographic area. As illustrated, one of the computers within distributed data processing system 10 is a portable computer 12. Portable computer 12 is typically a battery powered computer which includes a low power display system 16 which preferably provides a display screen 18 which may be implemented utilizing a liquid crystal display (LCD), a gas plasma display, or any other suitable technology display. Keyboard 14 is also provided which enables the user to access and modify data stored within portable computer 12 in a manner well known in the art.

As those skilled in the art will appreciate it is increasingly common for computers such as portable computer 12 to include therein a miniature cellular telephone transceiver (not shown) which is provided in conjunction with a modem. One example of a portable computer equipped with a combination modem/cellular telephone which may be utilized to implement portable computer 12 is the International Business Machines Corporation Model No. 9075 PCradio. Those skilled in the art will appreciate that a modem is a device which may be utilized to convert digital data from a computer to an analog signal which may be transmitted via a telecommunications systems. Additionally, such devices convert received analog signals from a telecommunications line to digital data which may be utilized by a computer. As is typical in such systems, a cellular telephone transmits a radio frequency signal via antenna 20 which may be received and relayed via multiple cellular system antenna 22. Thus, digital data within portable computer 12 may be converted into a series of analog signals and transmitted, via a cellular telephone and multiple intervening repeaters to a telephone system 24, in a manner well known to those skilled in this art.

Analog signals thus transmitted may be received by the telephone system and transmitted, via an ordinary telephone land line 26 to a computer 28 within distributed data processing system 10. While computer 28 is depicted as a personal computer, those skilled in the art will appreciate that computer 28 may be implemented utilizing a workstation, terminal or mainframe computer, as desired. Typically, computer 28 will also include a modem device permitting data from portable computer 12 to be transmitted to and received by computer 28 and computer 28 may also be linked to portable computer 12 utilizing cellular technology, rather than telephone land lines.

Thus, as those skilled in the art will appreciate upon reference to the foregoing, the transmission of data from portable computer 12 to computer 28 utilizing depicted cellular telephone technology is well known in the art. However, as the demands on cellular telephone systems increase and the amount of data being transmitted utilizing computers of the type depicted within FIG. 1 increases, the demands on the available channels within a cellular telephone system become much greater. Thus, it should be apparent that a need exists for a method and system whereby data may be transmitted via a cellular telephone system in an enhanced mode without degrading the ability of the cellular telephone system to accommmodate voice transmissions.

Figure 2:
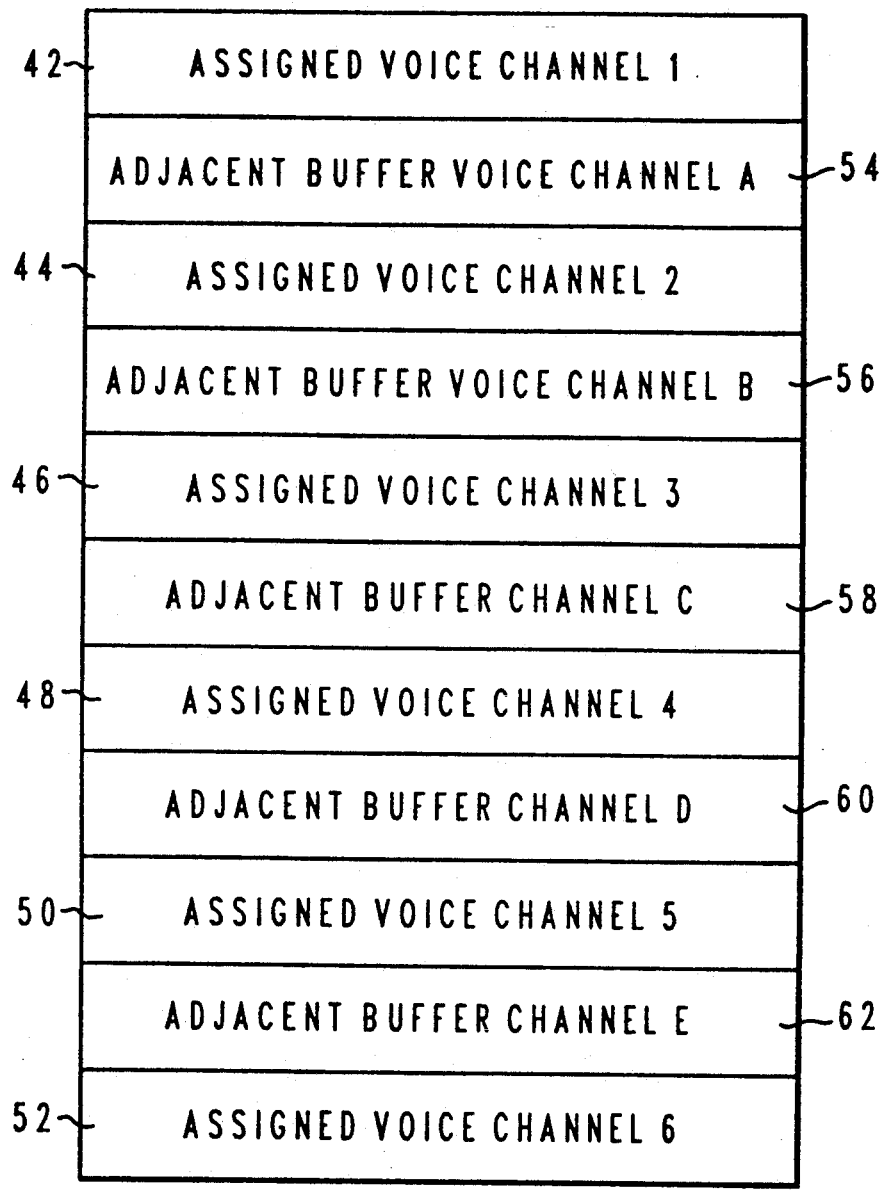
FIG. 2 is a pictorial representation of a plurality of assigned voice channels separated by adjacent buffer voice channels.

Referring now to FIG. 2, there is depicted a pictorial representation of a plurality of assigned voice channels separated by adjacent buffer voice channels in a manner typically provided within a cellular telephone system. As depicted, assigned voice channels 42, 44, 46, 48, 50, and 52 are pictorially illustrated within a frequency spectrum and are separated, as depicted, by adjacent buffer voice channels 54, 56, 58, 60, and 62. This is typically accomplished in order to minimize the interference between two assigned voice channels which are transmitting or receiving multiple cellular telephone transmissions simultaneously. Thus, by providing adjacent buffer voice channels between adjacent assigned voice channels, the amount of "cross talk" or other types of interference present within assigned voice channels may be effectively minimized.

As discussed above, it has been proposed to utilize these adjacent buffer voice channels within the cellular telephone system for transmission of data by utilizing a low data rate, low power data transmission system; however, such systems are not effective in that the interference with adjacent assigned voice channels is fairly great when the power or data rate within an associated data transmission channel exceeds a preselected minimum. Thus, it should be apparent that a need exists for a method and system which will permit the enhanced transmission of data within a cellular telephone system utilizing these adjacent buffer voice channels.

The method and system of the present invention yields much greater data speeds and minimal interference with assigned voice channels within a cellular telephone system by implementing a "spread spectrum" data transceiver within multiple adjacent buffer voice channels. That is, a data stream is divided into relatively short data packets which are sequentially transmitted via alternate adjacent buffer voice channels in a predetermined and repetitive order. Thus, the presence of data within an adjacent buffer voice channel is minimized for a particular assigned voice channel and the effect of interference caused by transmission of that data is effectively minimized. Additionally, the energy density within each adjacent buffer voice channel is restrained to fairly insignificant levels. This may be accomplished by utilizing a data processing system implemented in accordance with the method and system of the present invention. A high level block diagram of such a data processing system is depicted within FIG. 3.

Figure 3:
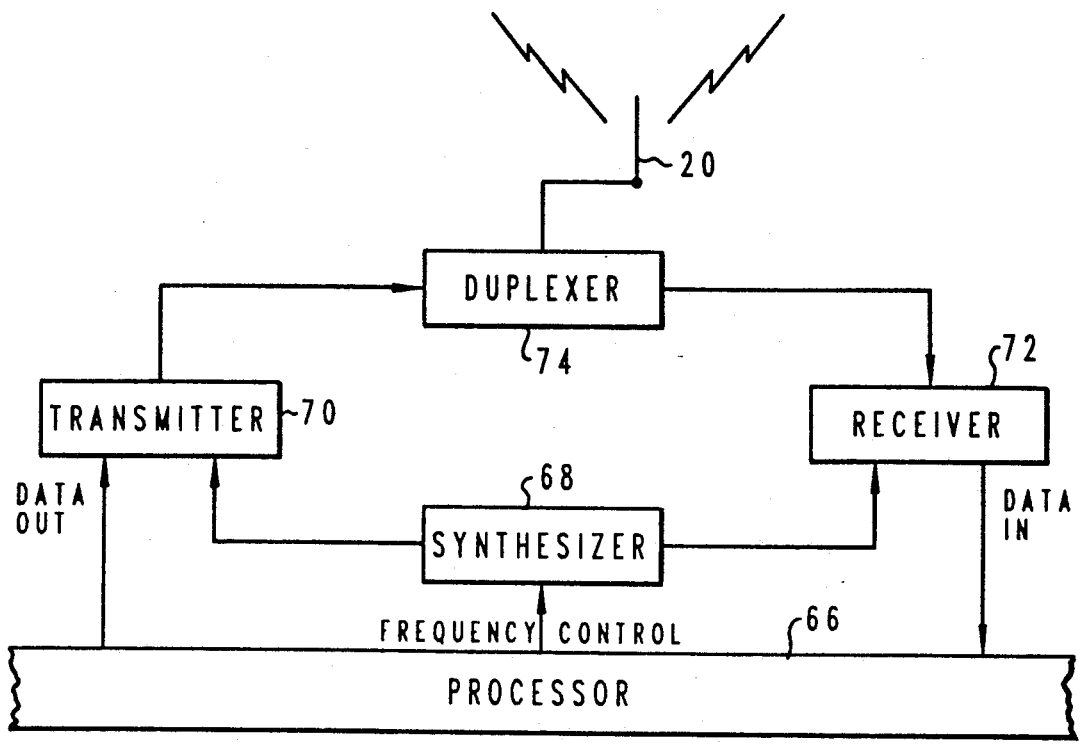
FIG. 3 is a high level block diagram of a data processing system which may be utilized for enhanced data transmission in accordance with the method and system of the present invention.

As illustrated, FIG. 3 depicts a processor 66 which is utilized to control synthesizer 68. Synthesizer 68 controls the transmit and receive frequencies of transmitter 70 and receiver 72 in accordance with EIA/TIA 553 Cellular Telephone Standards. Data from processor 66 which is to be transmitted by transmitter 70 is coupled to transmitter 70 and transmitted in relatively short data packets within alternating adjacent buffer voice channels in the manner described above. The output of transmitter 70 is coupled, via duplexer 74, to antenna 20 for transmission within the cellular telephone system.

Similarly, relatively short data packets may be received via antenna 20 and duplexer 74 and coupled to receiver 72. Receiver 72 is preferably selectively tuned to a series of predetermined adjacent buffer voice channels to receive each sequential data packet and that data is coupled from receiver 72 to processor 66. In this manner, a data stream may be transmitted and/or received within a cellular telephone system by dividing that data stream into a plurality of relatively short data packets and sequentially transmitting and receiving those data packets within alternate adjacent buffer voice channels which are present between assigned voice channels throughout a standard cellular telephone system.

Figure 4A:
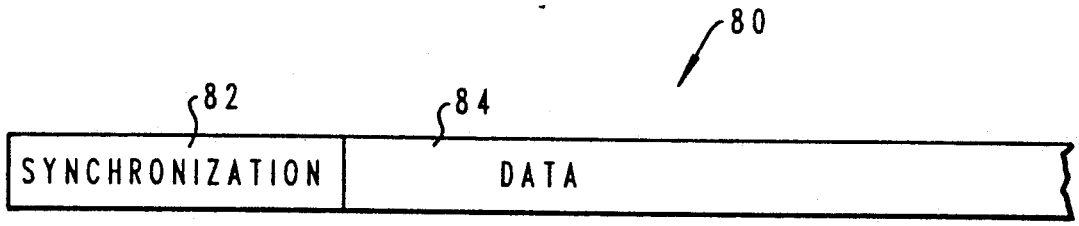
FIGS. 4a and 4b illustrate alternate embodiments of data packets which may be utilized for enhanced data transmission in accordance with the method and system of the present invention.
Figure 4B:
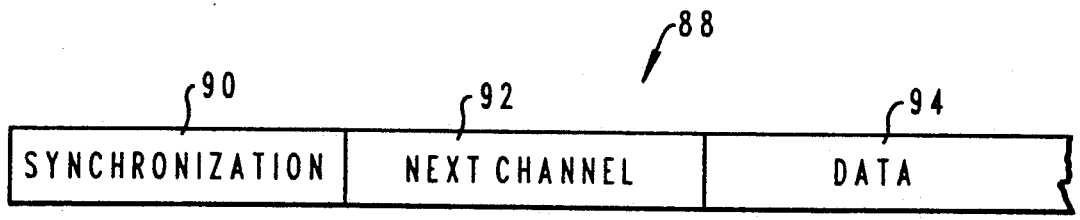

Referring now to FIGS. 4a and 4b, there are illustrated two alternate embodiments of data packets which may be utilized for synchronization in the enhanced data packet transmission system of the present invention. As depicted in FIG. 4a, a data frame 80 is illustrated which includes a synchronization packet 82 and a data packet 84. The length of data packet 84 is preferably fixed; however, this length may be set by the system operator. The length of data packet 84 is chosen to minimize the amount of interference within an adjacent assigned voice channel. Data packet 84 is preferably relatively short; however, data packet 84 is substantially longer than synchronization packet 82.

When utilizing the data frame 80 as depicted in FIG. 4a, data packets are preferably transmitted utilizing multiple adjacent buffer voice channels in a predetermined and repetitive order throughout all available adjacent buffer voice channels. Thus, a remote terminal may tune to a particular adjacent buffer voice channel and await the reception of a data packet. Thereafter, the remote terminal may tune to subsequent adjacent buffer voice channels in the predetermined and repetitive order necessary to receive the data stream.

An alternate data packet format is depicted at FIG. 4b wherein data frame 88 includes a synchronization packet 90, a "next channel" packet 92 and a data packet 94. In a manner similar to that described above, this data packet may be utilized to transmit data within a cellular telephone system while minimizing interference in adjacent assigned voice channels without requiring a predetermined and repetitive utilization of adjacent buffer voice channels. By utilizing "next channel" packet 92 to indicate the adjacent buffer voice channel within which the subsequent data packet will be contained the remote terminal receiving such a data packet may rapidly and efficiently tune to the next appropriate adjacent buffer voice channel.

Upon reference to the foregoing those skilled in the art will appreciate that by dividing a data stream into relatively short data packets and sequentially transmitting those data packets utilizing multiple adjacent buffer voice channels within a standard cellular telephone system, the amount of interference within an assigned voice channel may be minimized while maintaining relatively high data rates and signal strengths.

While the invention has been particularly shown and described with reference to a preferred embodiment, it will be understood by those skilled in the art that various changes in form and detail may be made therein without departing from the spirit and scope of the invention.

We claim:

1. A method for enhanced data stream transmission within a cellular telephone system having a plurality of assigned voice channels separated by adjacent buffer voice channels, said method comprising the steps of:
   dividing a data stream into a plurality of relatively short data packets; and
   sequentially transmitting individual ones of said plurality of relatively short data packets within alternate ones of said adjacent buffer voice channels throughout said cellular telephone system.

2. The method for enhanced data stream transmission within a cellular telephone system according to claim 1, further including the step of concatenating a synchronization packet with each of said plurality of relatively short data packets.

3. The method for enhanced data stream transmission within a cellular telephone system according to claim 1, further including the step of concatenating an identification of an adjacent buffer voice channel containing a subsequent one of said plurality of relatively short data packets with each of said plurality of relatively short data packets.

4. The method for enhanced data stream transmission within a cellular telephone system according to claim 1, wherein said step of sequentially transmitting individual ones of said plurality of relatively short data packets within alternate ones of said adjacent buffer voice channels comprises the step of sequentially transmitting individual ones of said plurality of relatively short data packets within alternate ones of said adjacent buffer voice channels in a predetermined and repetitive order throughout said cellular telephone system.

5. A data processing system for data stream transmission within a cellular telephone system having a plurality of assigned voice channels separated by adjacent buffer voice channels, said data processing system comprising:
   processor means for dividing a data stream into a plurality of relatively short data packets; and
   controllable transmitter means coupled to said processor means for sequentially transmitting individual ones of said plurality of relatively short data packets within alternate ones of said adjacent buffer voice channels throughout said cellular telephone system.

6. The data processing system for data stream transmission within a cellular telephone system according to claim 5, wherein said processor means further includes means for concatenating a synchronization packet with each of said plurality of relatively short data packets.

7. The data processing system for data stream transmission within a cellular telephone system according to claim 5, wherein said processor means further includes means for concatenating an identification of an adjacent buffer voice channel containing a subsequent one of said plurality of relatively short data packets with each of said plurality of relatively short data packets.

8. The data processing system for data stream transmission within a cellular telephone system according to claim 5, wherein said controllable transmitter means coupled to said processor means for sequentially transmitting individual ones of said plurality of relatively short data packets within alternate ones of said adjacent buffer voice channels in a predetermined and repetitive order throughout said cellular telephone system.

9. The data processing system for data stream transmission within a cellular telephone system according to claim 5, further including controllable receiver means coupled to said processor means for sequentially receiving individual ones of a second plurality of relatively short data packets within alternate ones of said adjacent buffer voice channels throughout said cellular telephone system.

10. The data processing system for data stream transmission within a cellular telephone system according to claim 5, wherein said processor means comprises a portable battery powered data processing terminal.

11. The data processing system for data stream transmission within a cellular telephone system according to claim 10, wherein said controllable transmitter means and said controllable receiver means comprise a cellular telephone transceiver coupled to said portable battery powered data processing terminal.

* * * * *